Figure 1:
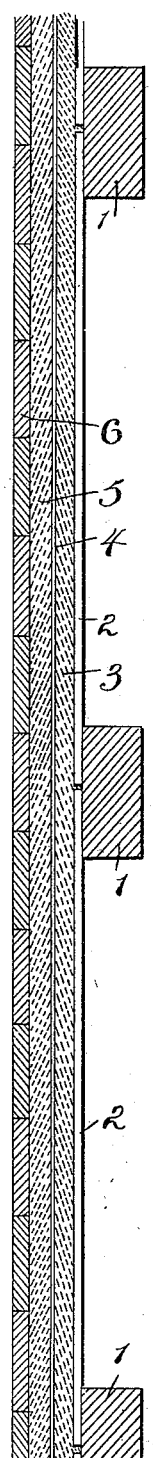

No. 703,928. Patented July 1, 1902.
E. S. HUTCHINSON.
METHOD OF LAYING TILES.
(Application filed Apr. 25, 1902.)
(No Model.)

Witnesses
Geo. E. Frech.
Chas. P. Wright Jr.

Inventor
Elias S. Hutchinson
By A. S. Pattison,
Attorney

UNITED STATES PATENT OFFICE.

ELIAS S. HUTCHINSON, OF WASHINGTON, DISTRICT OF COLUMBIA, ASSIGNOR OF ONE-HALF TO SAMUEL ROSS, OF WASHINGTON, DISTRICT OF COLUMBIA.

METHOD OF LAYING TILES.

SPECIFICATION forming part of Letters Patent No. 703,928, dated July 1, 1902.

Application filed April 25, 1902. Serial No. 104,705. (No specimens.)

*To all whom it may concern:*

Be it known that I, ELIAS S. HUTCHINSON, a citizen of the United States, residing at Washington, District of Columbia, have invented new and useful Improvements in Methods of Laying Tiles, of which the following is a specification.

My invention relates to an improved method of laying tile; and its object is to overcome the defects of the method now in use.

In the present method a coat of cement or other plastic material is applied to a suitable support and may be aptly termed a "backing." This backing is combed down to make it rough and to form a key for a second coat of cement or other plastic material, the second coat being generally applied directly to the first coating, but in some instances is applied to the tiles individually and which is known in the art as "buttering." The backing is permitted to set or harden as desired, and against it is applied the second coat, which is to receive the tiles and in which they are embedded. It is found in practice that this second coat hardens or sets so quickly that a portion thereof dries to such an extent before the tiles can be laid thereon as to require a wetting thereof. The wetting, however, washes out the cement and leaves practically a sandy surface, against which the tiles are laid or embedded. Owing to the fact that the cement or other plastic material which is to receive the tiles sets or dries so quickly, it does not properly take hold of the tiles nor properly enter into the interstices or pores thereof, as it should to make a permanent laying thereof, and the consequence is the tiles soon become loose and fall away, necessitating a relaying thereof. In the ordinary method the first coating or backing absorbs the moisture of the second coating, and air takes the place of the moisture, whether the second coating be applied directly to the backing or be applied by the well-known buttering method, and hence the second coating dries or sets before all of the tiles can be laid, which causes the well-known objectionable result already referred to.

The object of my invention is to prevent the quick drying out or the quick setting of the second coat of plastic material or cement, that is to receive the tiles, and hence have the second coat of plastic material retain its natural condition, (not requiring any wetting,) whereby the second coating of cement or other plastic material is in the best possible condition for receiving and having embedded therein the tiles and is also in the best possible condition to enter into and set in the interstices or pores of the tiles and to thereby effect a permanent laying thereof and makes a far superior job to the ordinary method of laying tiles.

My improved method consists in applying a coating of suitable material between the backing and the second coating of plastic material and to so isolate the two coats as to prevent the first coat or backing from absorbing the moisture of the second coat of plastic material. I preferably use an impervious material for the intervening or isolating material, which I find is very effective in preventing the quick drying out or setting of the second coating, which is to receive the tiles. I also preferably use a coating of coal-tar, though it will be readily understood that any other material which will effect the purpose of preventing the absorption of the moisture from the second coating by the first coating is within the scope of my improved method. I find that in the use of my method of interposing an isolating material to prevent the absorption of the moisture of the second coating by the backing the second coating will remain soft and in its natural condition for a long time, thus enabling all of the tiles to be laid or set while the second coating is in the best possible condition to make the best possible cementing action between the tiles and the plastic material in which they are embedded.

In the use of my method I preferably comb down the first coating to roughen it, as in the ordinary method. I then apply the intervening or isolating material, such as a coating of impervious material, and preferably, though not necessarily, applying to the impervious material while it is wet some sand, preferably coarse, like unto a sand-blast, to provide a rough surface and to insure a more effective joint or key between the backing and the second coating.

In the accompanying drawings I have illustrated my method as applied to walls; but it will be readily understood that it is equally adapted for use in connection with floors.

Figure 2:
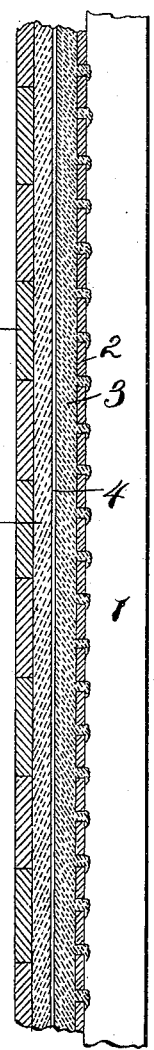

Figure 1 is a horizontal sectional view of a wall, showing my invention used in connection therewith. Fig. 2 is a vertical sectional view of Fig. 1.

Referring now to the drawings, 1 indicates supporting-studs, and 2 the laths or wooden support against which the plastic backing 3 is applied. The coating of isolating material 4 is applied to the outer surface of the backing, preferably after it has been combed down, as before stated, and then preferably sand is applied to the isolating or impervious coating 4. The backing is permitted to harden to the desired extent, preferably before the isolating or impervious material 4 is applied thereto. The second coating of plastic material 5 is then applied and, as before stated, will remain in its natural or soft condition quite a long time, enabling all of the tiles 6 to be applied thereto while it is in the best possible condition to make the best possible cementing connection between the tiles and the said outer coating 5.

Having thus described my invention, what I claim, and desire to secure by Letters Patent, is—

1. An improved method of laying tiles, consisting in providing a backing, applying thereto an isolating substance to prevent an absorption of the moisture of the second plastic coating, applying to the isolating substance a second coating and laying the tiles therein while it is moist.

2. An improved method of laying tiles, consisting in providing a backing, applying thereto a coating of impervious material, applying to the impervious material while wet, a suitable quantity of sand to form a key for a coating of plastic material, and applying thereto, a coating of plastic material and then laying the tiles upon the plastic material.

In testimony whereof I have hereunto set my hand in the presence of two subscribing witnesses.

ELIAS S. HUTCHINSON.

Witnesses:
ALICE W. HOFFMAN,
GEORGE E. FRECH.